K. E. PEILER.
MACHINE AND PROCESS FOR TREATING GUM.
APPLICATION FILED SEPT. 8, 1916.

1,263,281.

Patented Apr. 16, 1918.
2 SHEETS—SHEET 1.

Inventor:
Karl E. Peiler
by Harry P. Williams
Att'y.

K. E. PEILER.
MACHINE AND PROCESS FOR TREATING GUM.
APPLICATION FILED SEPT. 8, 1916.

1,263,281.

Patented Apr. 16, 1918.
2 SHEETS—SHEET 2.

Inventor:
Karl E Peiler
by Harry P. Williams
Atty.

UNITED STATES PATENT OFFICE.

KARL E. PEILER, OF HARTFORD, CONNECTICUT, ASSIGNOR OF SIX-NINTHS TO BEECH-NUT PACKING COMPANY, OF CANAJOHARIE, NEW YORK, A CORPORATION OF NEW YORK, AND TWO-NINTHS TO WILLIAM A. LORENZ AND ONE-NINTH TO KARL E. PEILER, BOTH OF HARTFORD, CONNECTICUT.

MACHINE AND PROCESS FOR TREATING GUM.

1,263,281.

Specification of Letters Patent. Patented Apr. 16, 1918.

Application filed September 8, 1916. Serial No. 119,035.

*To all whom it may concern:*

Be it known that I, KARL E. PEILER, a citizen of the United States, residing at Hartford, in the county of Hartford and State of Connecticut, have invented a new and useful Improvement in Machines and Processes for Treating Gum, of which the following is a specification.

This invention relates to the treatment of gums which in their raw commercial condition contain more or less bark, small stones and other foreign substances that must be removed in order to fit the gums for further treatment. The invention is more especially adapted to the treatment of chicle which is to be used in the manufacture of chewing gum. In order to free the undesirable matter the gum is generally melted, but chicle cannot be heated to such a degree as to render it a perfect liquid without deleteriously affecting its quality for subsequent use in chewing gum. Consequently it is desirable to subject chicle to as low a degree of heat as is possible in order to accomplish the desired end.

The object of this invention is to provide means for continuously, rapidly and efficiently rendering hardened chicle gum molten and removing the bark and other undesirable matter at as low a temperature as possible so as not to injure the quality of the gum.

In attaining this end a machine is designed having mechanism which reduces the gum to a semi-fluid state and at the same time disintegrates the foreign substances and passes the mass in a continuous viscous stream to mechanism which picks out the undesirable solid particles and forces the clear gum through a strainer, from which it is discharged in a continuous stream fit for further use.

Figure 1:
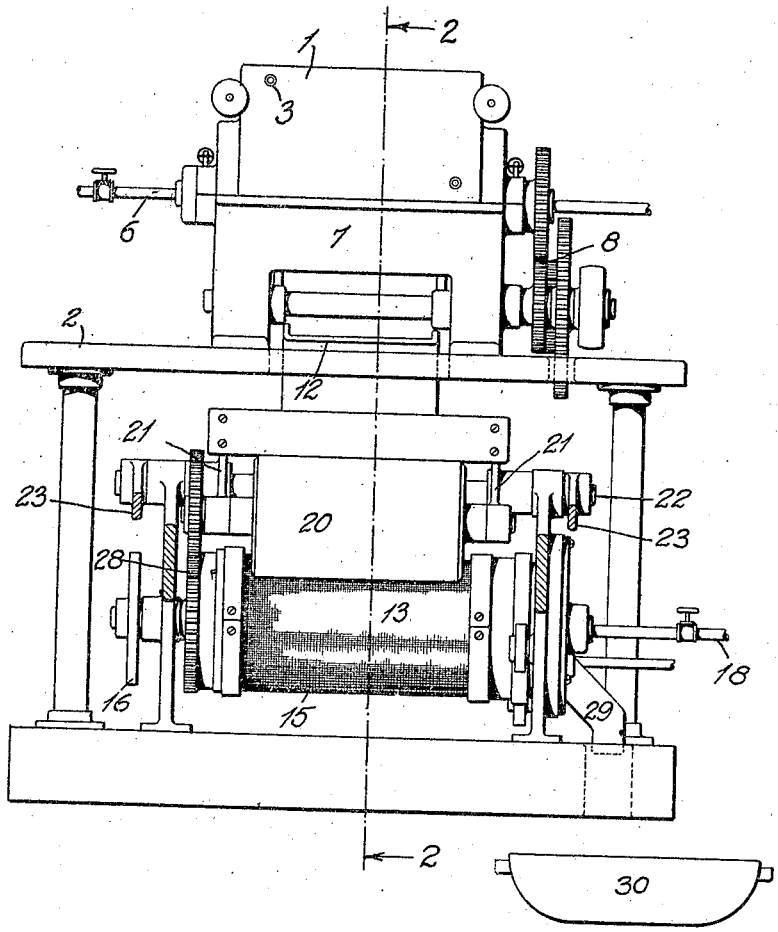
Figure 2:
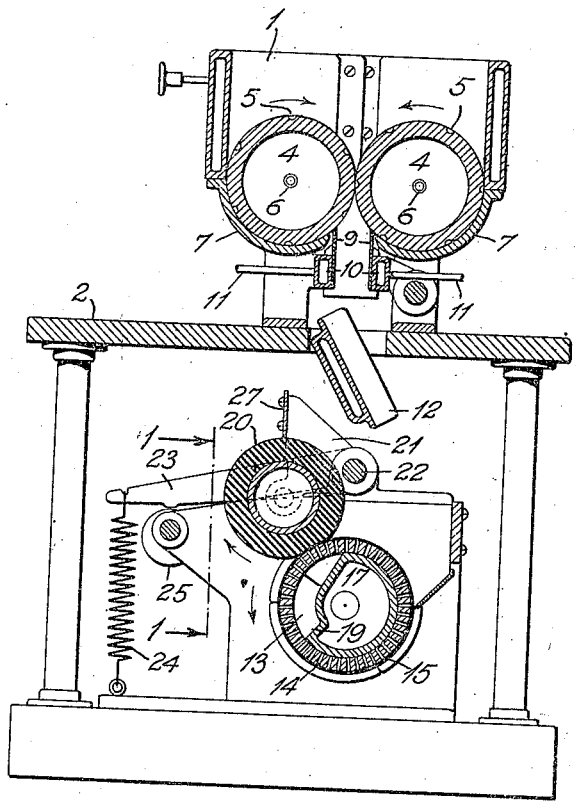

Figure 1 of the accompanying drawings shows a front elevation of a simple form of machine which embodies the invention. Fig. 2 shows a central vertical section of the machine on the plane indicated by the dotted line 2—2 on Fig. 1.

The machine illustrated has a hopper 1 for receiving the broken or granulated or powdered gum. This hopper is mounted on a frame 2 and its side walls are made hollow so that steam may be admitted from the pipe 3 for heating it and keeping the gum warm. In this hopper are two rotating cylinders 4 provided on their peripheral surfaces with cutting grooves 5. These cylinders are hollow so that they may be heated by steam admitted through the pipes 6. The bottom plates 7 of the hopper are shaped to closely conform to the cylinders, except below the line of contact between the cylinders, and the cylinders are provided with gears 8 by means of which they may be rotated toward each other at different rates of speed. Adjacent to the cylinders and with their edges in contact with the peripheral wall thereof, below the meeting line, are scrapers 9 which are mounted on the hollow boxes 10 that may be heated by means of steam admitted through pipes 11. Gum placed in the hopper is melted by the abrasion of the moving heated surfaces of the cylinders, and the particles of solid matter are disintegrated and reduced by the grinding action of the cylinders as such matter passes down with the molten gum between the cylinders. Owing to the friction of the heated surfaces of the cylinders the gum is rapidly made molten at a comparatively low degree of temperature, and it is crushed together with the solid particles as it passes between the cylinders so that the molten mass flows down onto the trough 12 below the cylinders in a continuous viscous stream.

In the frame below the melting means is a hollow rotatory cylinder 13. The peripheral wall of this cylinder is provided with perforations 14, and covering the perforations is a screen 15 formed of very fine mesh. A pulley or gear 16 may be arranged on the shaft of this cylinder for rotating it. In the cylinder is a scraper 17. This scraper is hollow so that steam may be admitted into the interior from the pipe 18, and it is held stationary so that its edge 19 will scrape the gum from the interior of the cylinder wall as the cylinder rotates.

Above and bearing upon the screened surface of the cylinder is a rubber covered roller 20. This roller is supported by arms 21 that are attached to the shaft 22. Levers 23 are attached to this shaft and the outer ends of these levers are drawn downward by springs 24. Cams 25 are arranged to limit the downward movement of the levers and thus regulate the pressure of the lever upon the cylinder. Fastened to the arms 21 that are mounted on the shaft 22 is a scraper 27, the lower edge of which is designed to engage the roller along the top. The gearing 28 causes the strainer cylinder and the rubber covered roller to rotate together.

The viscous stream of molten gum and disintegrated bark and other solid particles flows down from the trough 12 onto the screened cylinder and is carried thereby between it and the roller. The pressure of the roller forces the clear gum through the screen and perforations into the hot cylinder, while the roller with its relatively colder yielding surface picks out the solid particles and carries them around until they are collected by the scraper at the top, from which locality they may be removed by any suitable means. The clear gum, which is scraped from the interior of the cylinder, is directed by the scraper to the end of the cylinder, where it escapes through the spout 29 to the receptacle 30.

The invention claimed is;

1. A machine for treating gum which comprises a hopper for receiving the gum, melting cylinders with cutting grooves in their peripheral surfaces closing the opening through the bottom of the hopper, means for heating said cylinders, means for rotating said cylinders at different rates of speed, scrapers for removing gum from said cylinders, a screen covered perforated straining cylinder for receiving the viscous mass from the melting cylinders, a scraper for removing the gum from the interior of the straining cylinder, means for heating the scraper and cylinder, a roller with a relatively cold yielding surface bearing upon the screened surface of the straining cylinder, mechanism for rotating the straining cylinder, and a scraper engaging the surface of said roller.

2. A machine for treating gum which comprises a hopper for receiving the gum, heated cylinders with cutting grooves in their peripheral surfaces closing the opening through the bottom of the hopper, mechanism for rotating the cylinders at different rates of speed, and mechanism for straining the material melted and disintegrated by said cylinders.

3. A machine for treating gum which comprises mechanism for melting and grinding the material, a screened and perforated hot cylinder for receiving the molten and disintegrated material, a scraper for removing the gum from the interior of the cylinder, a roller with a relatively cold yielding surface bearing upon the screened surface of the cylinder, a scraper engaging the surface of said roller, and mechanism for rotating said cylinder and said roller.

4. A machine for treating gum which comprises a hopper for receiving the gum, a continuously rotated heated surface for melting the gum and grinding the impurities, a continuously rotated heated screen for straining the melted gum, and a continuously rotated roller for removing the impurities from the gum and forcing it through the strainer.

5. A machine for treating gum which comprises a hopper for receiving the gum, a continuously rotated heated surface for melting the gum and grinding the impurities, a continuously rotated heated screen for straining the melted gum, a continuously rotated roller for removing the impurities from the gum and forcing it through the strainer, and means for removing the strained gum from the strainer.

6. The method of treating gum which consists in melting the gum, depositing the melted gum on a continuously moving strainer, forcing the gum through the moving strainer and by the forcing means simultaneously picking the impurities out of the melted gum and off from the moving strainer.

7. The method of treating gum which consists in melting the gum and simultaneously disintegrating the impurities therein, depositing the molten gum and impurities on a continuously moving strainer, forcing the gum through the moving strainer and by the forcing means picking the impurities out of the melted gum and off from the moving strainer.

8. The method of treating gum which consists in subjecting the gum to a continuously moving heated surface, depositing the molten gum on a continuously moving strainer, and simultaneously forcing the gum through the moving strainer and by the forcing means picking the impurities out of the melted gum and off from the moving strainer.

9. The method of treating gum which consists in simultaneously melting and grinding the gum and depositing the molten mass upon a continuously moving strainer, and simultaneously forcing the gum through the moving strainer and picking out and carrying away the impurities.

10. The method of straining gum which consists in melting the gum and grinding the impurities therein, and subsequently simultaneously picking out and carrying away the impurities and forcing the clear gum through a strainer.

KARL E. PEILER.